Oct. 18, 1966   J. M. EITEL   3,279,758
APPARATUS AND METHOD FOR LASHING AND PLACING
AERIAL CABLE AND STRAND
Filed Aug. 20, 1964   3 Sheets-Sheet 1

INVENTOR.
Jay M. Eitel
BY
Attorneys

Oct. 18, 1966  J. M. EITEL  3,279,758
APPARATUS AND METHOD FOR LASHING AND PLACING
AERIAL CABLE AND STRAND
Filed Aug. 20, 1964  3 Sheets-Sheet 2
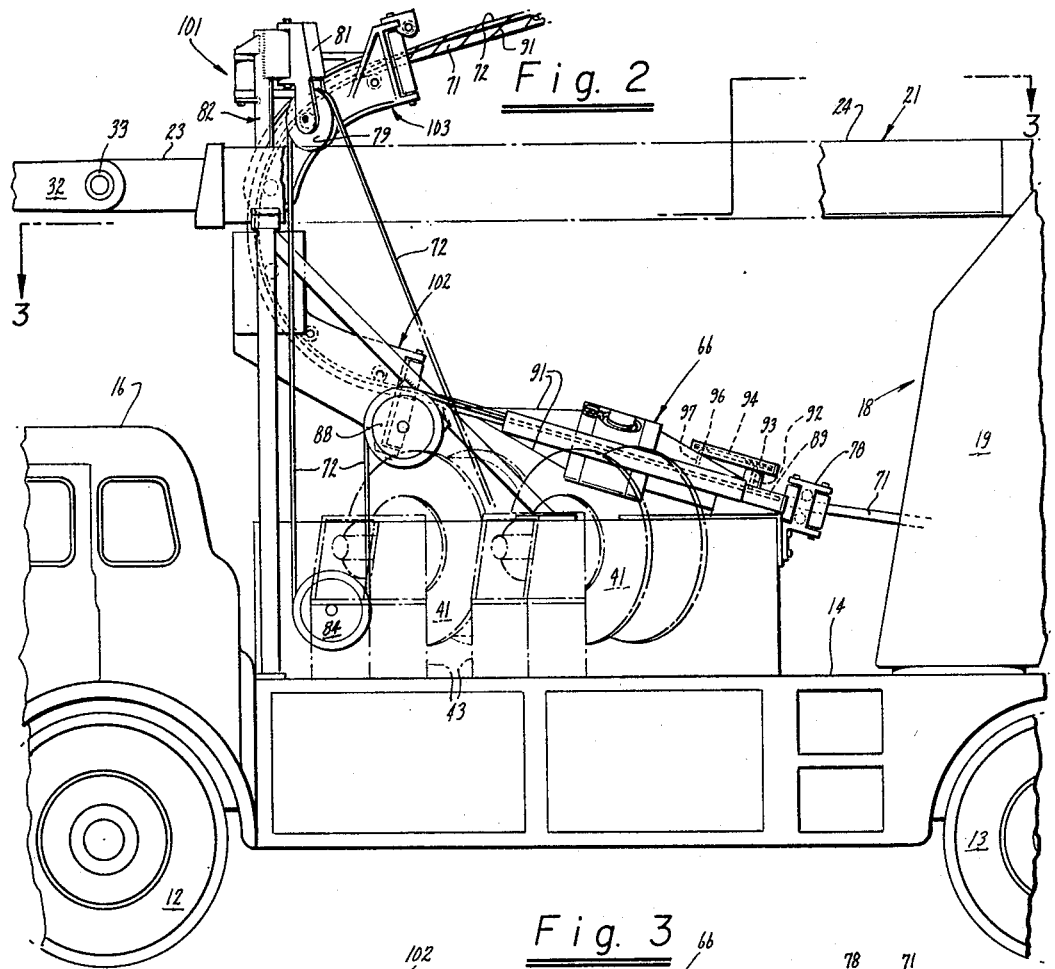
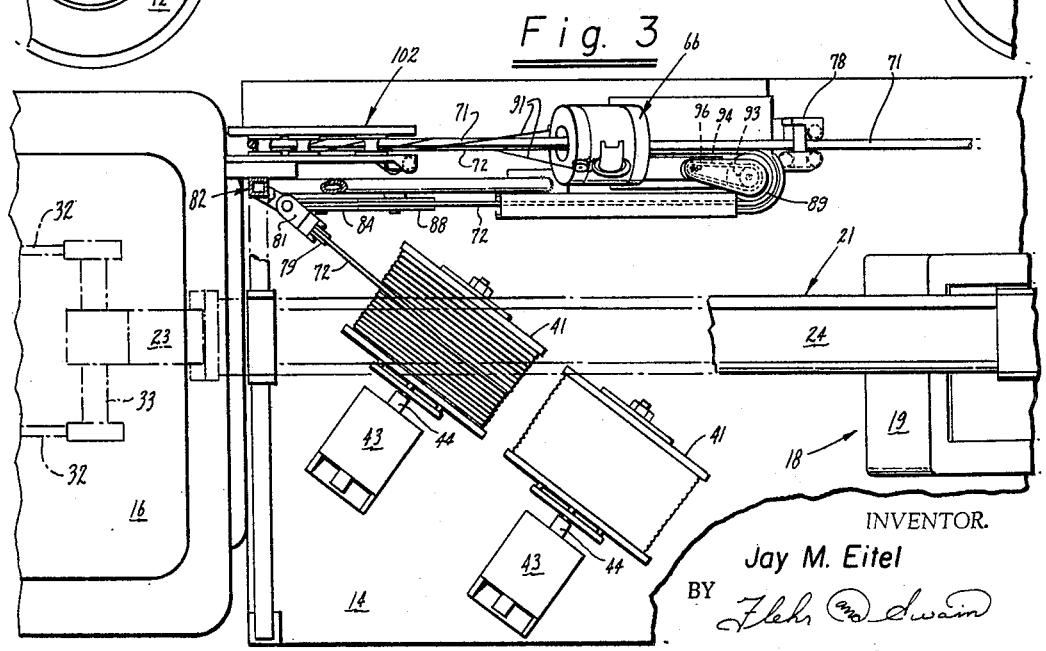
INVENTOR.
Jay M. Eitel
BY
Attorneys

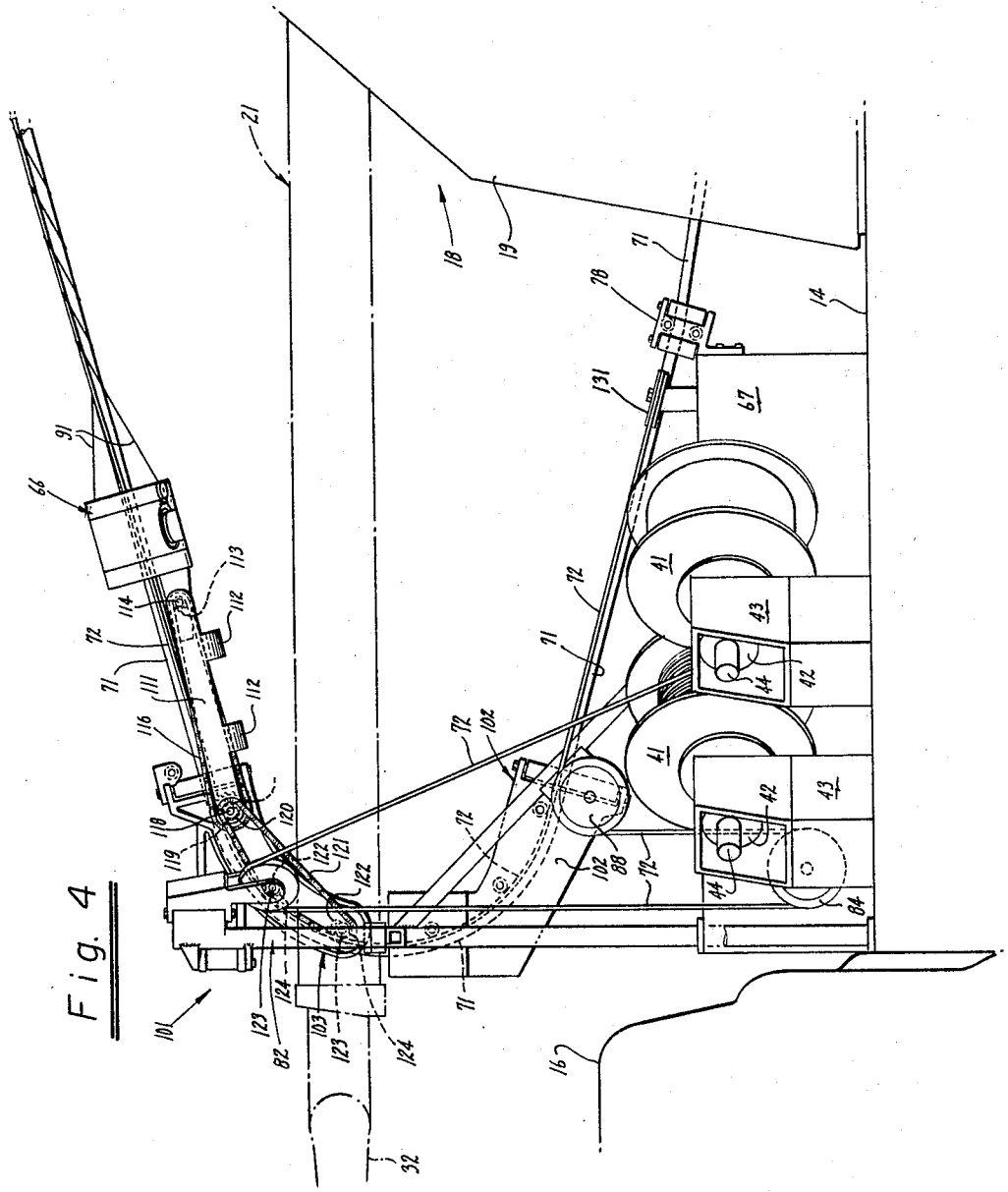

United States Patent Office 3,279,758
Patented Oct. 18, 1966

3,279,758
APPARATUS AND METHOD FOR LASHING AND PLACING AERIAL CABLE AND STRAND
Jay Miller Eitel, Los Altos, Calif., assignor to Telsta Corporation, San Carlos, Calif., a corporation of California
Filed Aug. 20, 1964, Ser. No. 390,988
6 Claims. (Cl. 254—134.3)

This invention relates to an apparatus and method for lashing and placing aerial cable and strand and particularly to such an apparatus which includes an aerial lift.

Apparatus has heretofore been provided for prelashing of cable to strand and thereafter positioning the lashed cable and strand into a position so that it can be secured to supports provided for the strand as for example poles. Such apparatus, however, has been cumbersome and expensive and not particularly adapted for the prelashing of light cables or coaxial cable. There is therefore a need for a new and improved apparatus and method for lashing and placing aerial cable and strand.

In general, it is an object of the present invention to provide an apparatus and method for lashing and placing aerial cable and strand which overcomes the above named disadvantages.

Another object of the invention is to provide an apparatus and method of the above character which is particularly adapted for use in stringing light cables and coaxial cable.

Another object of the invention is to provide an apparatus and method of the above character which makes it possible to string the prelashed cable under tension without endangering the cable.

Another object of the invention is to provide a method and apparatus of the above character and which is possible to position the cable without placing undue stress upon the cable.

Another object of the invention is to provide an apparatus and method of the above character in which the tension on the strand can be readily adjusted.

Additional objects and features of the invention will appear from the following description in which the preferred embodiments have been set forth in detail in conjunction with the accompanying drawings.

Referring to the drawings:

FIGURE 2 is a parital side elevational view of the apparatus shown in FIGURE 1.

FIGURE 3 is a partial plan view of the apparatus shown in FIGURE 1.

FIGURE 4 is a side elevational view of a portion of another embodiment of the present invention.

Figure 1:
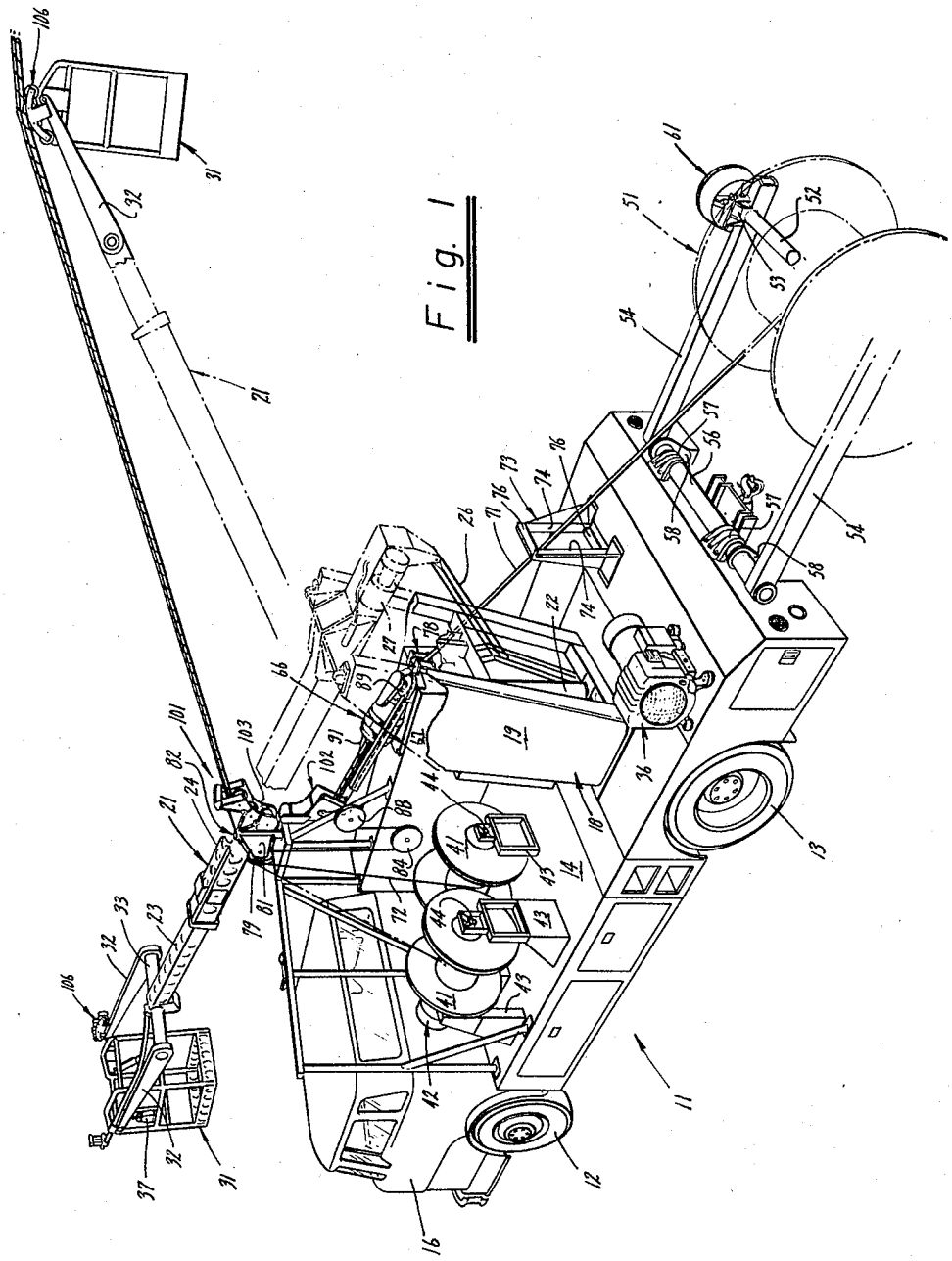
FIG. 1 is an isometric view of an apparatus for lashing and placing aerial cable and strand utilizing my method.

In general, my apparatus for lashing and placing aerial cable and strand consists of a platform. At least one reel of cable and one reel of strand is provided on or adjacent to the platform. Means is provided for rotatably mounting the cable reel. Lashing apparatus is carried upon the platform and guiding means is also mounted on the platform and guides the cable and the strand from the reels into the lashing apparatus. The guiding means for the strand includes means for applying a predetermined tension to the strand. Means is also provided for guiding the cable and strand after they have been lashed together which may include a boom structure mounted on the platform so that the lashed cable and strand may be positioned on suitable supports such as poles.

As shown in the drawings, my apparatus for lashing and placing aerial cable and strand consists of a self-propelled vehicle 11 having front and rear wheels 12 and 13 upon which a framework or platform 14 is mounted. A conventional cab 16 is mounted on the front of the self-propelled vehicle and contains means (not shown) for supplying motive power to the wheels 12 and 13.

A lifting equipment 18 is mounted near the rear of the platform 14. The lifting equipment can be of any suitable type such as one with an extensible boom structure of the type shown in the drawings or in the alternative one with an articulated boom structure well known to those skilled in the art.

The lifting equipment 18 is provided with a load supporting structure or turret 19 which is mounted upon the platform 14 in a manner such as shown in U.S. Patent 2,841,404. As disclosed in that patent, the load supporting structure 19 is mounted for rotation about a vertical axis. An extensible boom structure 21 is mounted upon the load supporting structure 19 for rotation about a horizontal axis formed by the pivot shaft 22. The extensible boom structure is provided with an outer section 23 and inner telescoping section 24. Means which includes a chain 26 is provided for raising and lowering the outer end of the boom structure about the horizontal axis 22 and is generally of the type disclosed in U.S. Patent Nos. 3,055,459 and 2,996,141. Means is also provided for extending or retracting the inner telescoping boom section 24 with respect to the outer boom section 23 and includes a drive motor 27 and is generally of the type disclosed in U.S. Patent No. 2,896,750.

A workman's or operator's platform or basket 31 is mounted on the outer free end of the boom structure 21 by suitable means such as pivotally connecting the same to a pair of arms 32 which is secured to the outer end of the inner boom section 24 by tubular members 33.

Control means is provided for controlling operation of the boom structure either from the workman's platform or basket 31 or from the ground or from the vehicle itself. Such means includes a motor generator set 36 which is mounted to the rear and on one side of the platform 14. Suitable means which includes a control switch 37 mounted on the workman's platform or basket 31 is provided for supplying power from the motor generator set 36 to the electric motors which are utilized for rotating the lift support structure 19 about a vertical axis, raising or lowering the outer end of the boom structure about the horizontal axis 22 and for extending or retracting the inner boom section 24 with respect to the outer boom section 23. The control mechanism 37 is of the type described in U.S. Patent No. 2,841,404.

At least one reel of strand 41 is carried upon the vehicle 11. For reasons hereinafter explained, it is generally desirable to carry two reels 41 of strand. Means is provided for rotatably mounting each of the reels of strand upon the front portion of the platform between the support structure 19 and the rear of the cab 16 and consists of an electrically operated brake 42 of the type described in copending application Serial No. 93,684, filed March 6, 1961. The brake 42 includes a housing 43 which is secured to the platform 14. A removable shaft 44 is rotatably mounted in the housing 43 and is adapted to carry the reel 41.

As will be noted from FIGURE 1 of the drawings, the strand reels 41 are mounted at an angle to facilitate guiding of the strand from the reel 41 as hereinafter described. Both of the reels 41 are positioned in such a manner so that their axes of rotation are substantially parallel and so they extend from the center to one side of the platform 14 between the load supporting structure 19 and the cab 16.

At least one reel 51 of cable is carried by or adjacent the vehicle. If desired, a pair of reels can be carried on the vehicle. The reels of cable can be carried in a suitable manner such as upon a shaft 52 which is rotatably mounted in brackets 53 carried by arms 54. The arms 54 are rigidly secured to a tubular member 56 which is pivotally mounted in large bushings 57 secured to the framework 14. Conventional means such as hydraulic system which includes a hydraulic ram (not shown) is provided for moving a lever arm 58 to raise and lower the arm 54 and the reels 51 carried thereon. The brackets 53 are constructed in a manner so that the shaft 52 can be removed therefrom to permit it to be placed in the reels 51 before the reels 51 and the shaft 52 are lifted into position so that the ends of the shaft 52 rest in the brackets 53.

Means is provided for braking the rotation of the reels 51 and consists of an adjustable electrical brake 61 of a type similar to that described in copending application Serial No. 93,684, filed March 6, 1961.

A lasher 66 of a suitable type now on the market is mounted upon a support structure 67 mounted on one side of the platform 14 between the load supporting structure 19 and the cab 16. The lasher 66 is mounted in such a manner that the axis of travel of the cable through it is inclined upwardly and forwardly.

Means is provided on the platform 14 for guiding cable 71 from the reels 51 and strand 72 from the strand reels 41 so that it is guided into and through the lasher 66. Thus as shown in the drawings such means can consist of means for guiding the cable 71 consists of a cable guiding device 73 mounted on the platform to the rear of the load supporting structure and on one side of the platform 14. This cable guiding device can be constructed somewhat similar to that disclosed in U.S. Patent No. 2,949,279 and as shown in the drawing can consist of a pair of spaced parallel vertical rollers 74 and a pair of spaced parallel horizontal rollers 76. Means (not shown) is provided whereby the upper roller 76 can be removed to permit the cable 71 to be placed within the cable guide. An additional cable guiding device 78 also similar to that described in U.S. Patent No. 2,949,279 is mounted on the support structure 67 and guides the cable 71 just before it enters the lasher 66.

Means is also provided for guiding the strand 72 into the lasher and consists of a pulley 79 rotatably mounted in a bracket 81 swingably mounted upon a vertical post 82 fastened to the support structure 67. Thus, as can be seen from the drawings, the strand 72 passes upwardly and around the pulley 79 downwardly and under another pulley 84.

Means is provided for applying a braking force to the pulley 84 and consists of an adjustable electrical brake 86 mounted in the support structure 67 of a type similar to that described in copending application Serial No. 93,684, filed March 6, 1961. If necessary, in order to obtain sufficient frictional engagement between the pulley 84 and the strand 72, the pulley may be provided with a helical groove to form more than one strand receiving or recess so that one or more wraps of the strand 72 may be made about the pulley to obtain the desired frictional engagement. In this way by operation of the brake 86, the desired amount of tension can be applied to the strand 72 as it is payed into the lasher 66.

The strand 72 after passing over the pulley 84 passes over another pulley 88 which is rotatably mounted upon the support structure 67. The strand 72 then passes over another pulley 89 secured to the lasher 76 and then passes through the lasher 76 in a direction parallel to the direction in which the cable 71 passes through the lasher. The pulley 89 is provided with means for driving the operating parts of the lasher 66 so that the lashing wire 91 carried by the lasher is wrapped in a helical fashion well known to those skilled in the art with the desired spacing about the cable 71 and the strand 72 as it passes through the lasher 66. The means for driving the lasher 66 can take any suitable form such as shown in the drawing. Thus the pulley 89 drives a shaft 92 on which a sprocket 93 is mounted. The sprocket 93 drives a chain 94 which drives a sprocket 96 mounted on a shaft 97. The shaft 97 is directly connected to the drive mechanism of the lasher 66 and operates the same as the pulley 89 is rotated by the strand 72.

Prior to the time that the cable and strand are lashed together by the lashing wire 91 the desired amount of tension is placed upon the strand 72 and upon the cable 71. As is well known to those skilled in the art, the tension placed on the strand 72 is substantially greater than that placed on the cable 71 because it is the strand 72 which will support and carry the cable 71.

Means is provided for guiding the lashed cable and strand after they have passed through the lasher 66 and consists of a cable guiding device 101 of a type very similar to that described in United States Patent No. 3,103,345. The cable guiding device 101 is mounted upon the support member 82. As explained in Patent Nos. 3,103,345, this cable guiding device includes a lower section 102 which is secured directly to the support member 82 and which forms an arcuate path for the travel of the lashed cable and messenger to guide the same from a substantially horizontal position into a substantially vertical position. It also includes an upper section 103 which is swingably mounted upon the post or member 82 so that it casters with respect to the lower section 102. The upper section 103 provides an arcuate path which guides the lashed cable and strand from a substantially vertical position as fed from the lower section 103 into an inclined position. In addition, the castered section 103 makes it possible for the section 103 to follow the lashed cable and string as it is being payed out. If desired, the lashed cable and strand can be payed directly out to the support members or poles and the strand secured to the poles with the strand being under tension to provide the necessary support for the cable.

In operation of the apparatus shown in FIGURES 1, 2 and 3 in performing my method, it will be noted that the lasher 66 is positioned so that the lashing wire 91 passing from the lasher 66 enters the cable guiding device 101 which may be called a swivel bull wheel at a point which is immediately below the arcuate path formed by the lower section 102. The positioning of the lasher 66 relative to the lower section 102 of the swivel bull wheel 101 is particularly important in that the positioning of the lasher in this position makes it possible for a complete wrap of the lashing wire to be made around the cable and the strand while it is passing over the arcuate path formed by the lower section 102. Since the strand 72 is under greater tension than the cable 71, the strand will be on the inner side of the arcuate path and for this reason the cable 71 will be traveling over an arcuate path having a larger diameter so that in effect the cable and the strand are lashed together by the lashing wire while they are passing through two different radii. The lashed wire is further tightened around the cable and strand as the lashed cable and the strand passes over the arcuate path formed by the upper section 103. Thereafter as the lashed cable and strand leaves the cable guiding device or swivel bull wheel 101, the cable will have a tendency to straighten out and since it was wrapped under a larger diameter, will cause the cable to be placed under compression between the loops of the lashing wire about the cable. This has been found to be particularly advantageous when cable of the type which contains a multiplicity of pairs of conductors is utilized. This is because the placing of the cable under compression between wraps of the lashing wire facilitates the splicing of the telephone cable in that it provides slack in the pairs of conductors to facilitate splicing.

In many applications, it may be desirable to utilize the boom structure 21 for positioning the lashed cable and strand. Thus as shown in FIGURE 1, the boom structure 21 is moved to a position in which it can guide the lashed cable and strand as it passes from the cable guiding device 96. When such is the case, the lashed cable and strand passes through an additional cable guiding device 106 carried by one of the arms 32. The cable guiding device 106 is provided with a plurality of rollers forming a curved path facilitating placement of the cable. As can be seen from the drawing the boom structure 21 can be utilized for positioning the lashed cable and strand on either side of the mobile vehicle.

When it is desired to place lashed cable and strand in which compression forces for compressing the cable are not desirable as for example when positioning coaxial cable or the like, another embodiment of my apparatus is utilized such as that shown in FIGURE 4 in which the lasher 66 is positioned so that the cable and strand are lashed together after they have passed through the cable guiding device or swivel bull wheel 101. In this arrangement as shown in FIGURE 4, the lasher 66 is pivotally supported upon a pair of arms 111 which are pivotally connected to the upper section 103 of the cable guiding device 101. Suitable bracing 112 is provided between the arms to prevent twisting motion of the arms. Suitable means is provided for driving the lasher 66 and as shown in the drawings can consist of a sprocket 113 which is affixed to a shaft 114 directly connected to the operating mechanism of the lasher. The sprocket 113 is driven by a chain 116 which is driven by a sprocket 117 mounted upon a shaft 118. A roller 119 is mounted on a shaft 118 and is adapted to be engaged by the cable and strand. An additional sprocket 120 is driven by a chain 121. The chain 121 is driven by sprockets 122 carried by shafts 123 upon which are mounted rollers 124 engaged by the cable and strand.

Other portions of the apparatus shown in FIGURE 4 are substantially identical to that hereinbefore described with the exception that an additional pulley 131 mounted on the support structure is provided for guiding the cable.

The operation and use of the apparatus shown in FIGURE 4 is similar to that shown in FIGURES 1, 2 and 3 with the exception that the cable and strand are lashed together after the cable and strand have been guided by the swivel bull wheel or cable guiding device 101. This means that the strand and cable will be lashed together without the cable being placed under compression as occurs when the cable and strand are lashed together during the time that they are passing through the swivel bull wheel or cable guiding device 101. This is particularly advantageous for use when the apparatus is utilized for placing certain cable such as coaxial cable where the splicing of the multiplicity wires is not required.

The tension on the strand and the cable can be readily adjusted by the various brakes which have been provided on the cable reels and on the brake for one of the pulleys for guiding the strand.

It is apparent from the foregoing that I have provided new and improved apparatus and method for lashing and placing aerial cable and strand which is particularly advantageous for the placing of various types of cable and particularly for placing cable which is relatively light.

I claim:

1. In a method for the lashing of cable to strand under tension, passing the cable and strand through substantially parallel paths with the cable passing through a path slightly greater in diameter than the path through which the strand passes and wrapping lashing wire around the cable and strand to bind the same together while said cable and strand are passing through said arcuate paths to thereby place the cable in compression on the strand when the lashed cable and strand emerge from said arcuate paths and are positioned aloft.

2. In apparatus of the character described, a platform, at least one reel of cable, means for rotatably mounting the cable reel so that it is positioned in the vicinity of the platform, at least one reel of strand, means for rotatably mounting the reel of strand on the platform, lashing apparatus carried upon the platform, guiding means mounted in a fixed position on the platform for guiding cable from the cable reel into the lashing apparatus, means mounted on the platform for guiding the strand from the strand reel into the lashing apparatus, the means for guiding the strand into the lashing apparatus including means for applying a predetermined tension to the strand, a lift supporting structure mounted upon the platform for rotation about a vertical axis, a boom structure mounted on the lift supporting structure, and cable guiding means carried by the boom structure and adapted to receive and guide the cable and strand after they have been lashed together by the lashing apparatus.

3. In apparatus of the character described, a platform, at least one reel of cable, means for rotatably mounting the cable reel so that it is positioned in the vicinity of the platform, at least one reel of strand, means for rotatably mounting the reel of strand in the vicinity of the platform, lashing apparatus carried upon the platform, guiding means mounted on the platform for guiding cable from the reel into the lashing apparatus, means mounted on the platform for guiding strand from the strand reel into the lashing apparatus, the means for guiding the strand into the lashing apparatus including means for applying a predetermined tension to the strand, and guiding means for guiding the cable and strand after they have been lashed together, said last named guiding means having two sections, one of the sections being castered with respect to the other section so that it can follow the lashed cable and strand as it is being positioned aerially.

4. In apparatus of the character described, a platform, at least one reel of cable, means for rotatably mounting the cable reel so that it is positioned in the vicinity of the platform, at least one reel of strand, means for rotatably mounting the reel of strand so that it is positioned in the vicinity of the platform, lashing apparatus carried upon the platform, guiding means mounted on the platform for guiding cable from the cable reel into the lashing apparatus, means mounted on the platform for guiding the strand from the strand reel into the lashing apparatus and means for guiding the strand into the lashing apparatus including means for applying a predetermined tension to the strand, said guiding means mounted on the platform for guiding the cable from the cable reel and said means mounted on the platform for guiding the strand from the strand reel including a cable guiding device, said cable guiding device having two sections, each of the sections forming an arcuate path for the travel of the strand and cable, one of the sections being castered for pivotal movement with respect to the other.

5. Apparatus as in claim 4 wherein the lashing apparatus is secured to the castered section of the cable guiding device so that it follows the cable with the castered section.

6. In apparatus of the character described, a platform, at least one reel of cable, means for rotatably mounting the cable reel so that it is positioned in the vicinity of the platform, at least one reel of strand, means for rotatably mounting the reel of strand so that it is positioned in the vicinity of the platform, lashing apparatus carried upon the platform, guiding means mounted in a fixed position on the platform for guiding cable from the cable reel into the lashing apparatus, means mounted on the platform for guiding the strand from the strand reel into the lashing apparatus, the means for guiding the strand into the lashing apparatus including means for applying a predetermined tension to the strand, a lift supporting structure rotatably mounted upon the platform, a boom structure mounted upon the lift supporting structure and cable guiding means carried by the boom and adapted to receive and guide the cable and strand after they have been lashed by the lashing apparatus.

References Cited by the Examiner

UNITED STATES PATENTS 3,172,643  3/1965  Mattingly et al.

WILLIAM FELDMAN, *Primary Examiner.*

OTHELL M. SIMPSON, *Examiner.*